United States Patent Office 2,854,565
Patented Sept. 30, 1958

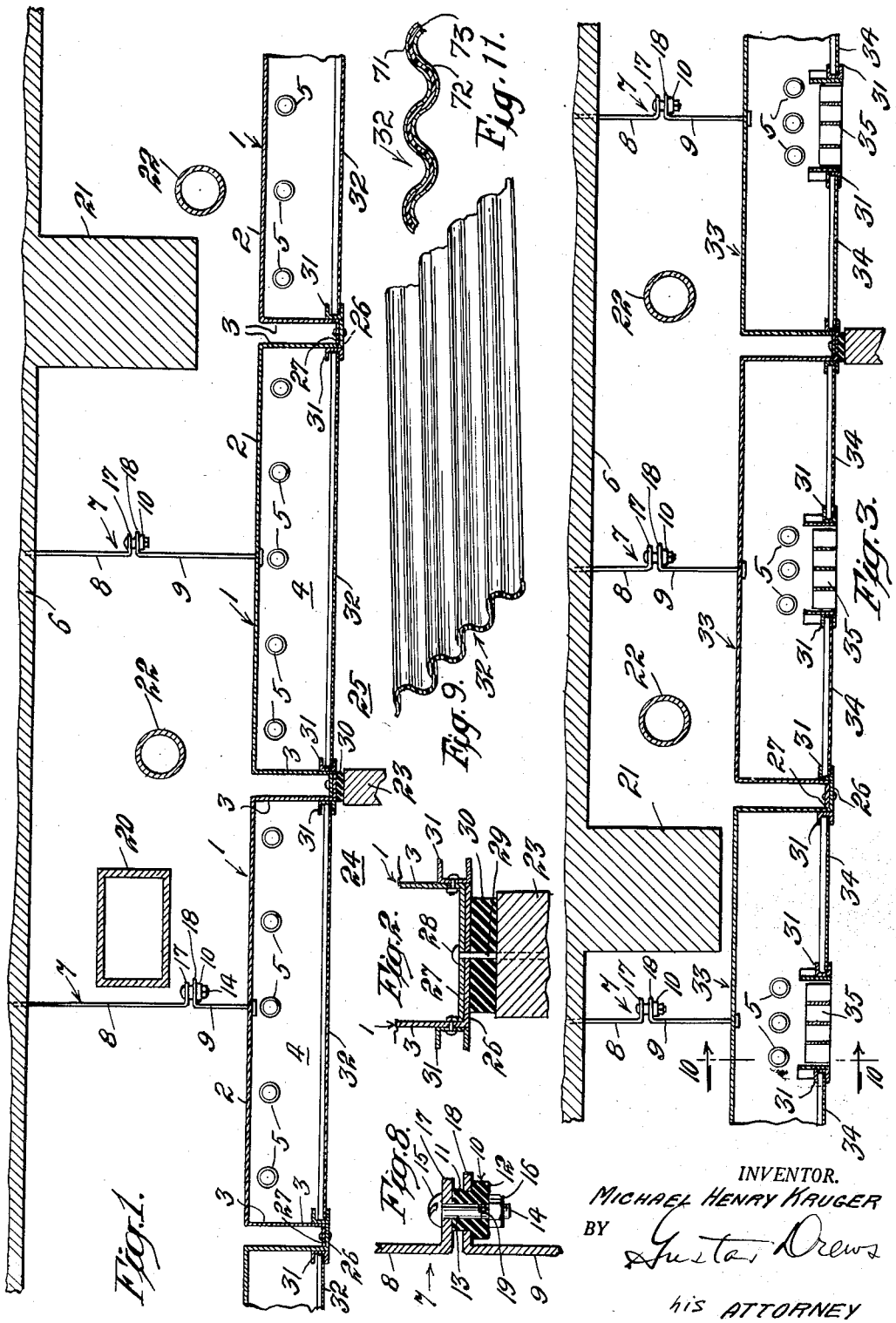

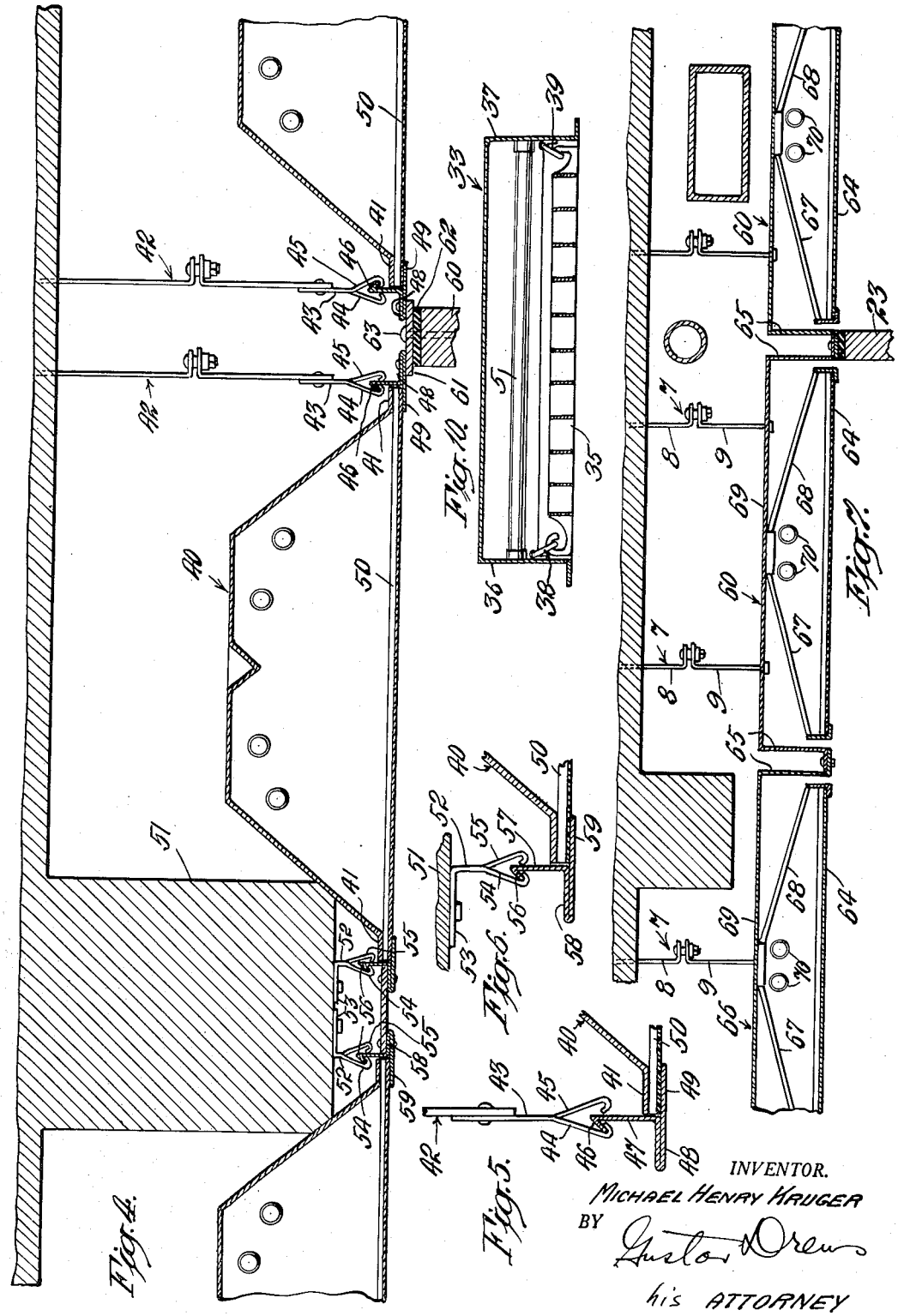

2,854,565

LUMINOUS SOUND ABSORBING CEILING

Michael Henry Kruger, Chestnut Hill, Mass., assignor to A. L. Smith Iron Company, Chelsea, Mass., a corporation of Massachusetts Application February 16, 1956, Serial No. 565,797

2 Claims. (Cl. 240—9)

This invention relates to luminous ceilings in general, and more particularly to luminous ceilings which will not only absorb sound of the area in which used, but will also constitute a sound barrier against the transmission of sound to an adjacent area.

Among the objects of the present invention it is aimed to provide an improved luminous ceiling consisting of a combination sound barrier and light reflector, a source of light, such as tubular fluorescent lamps, and a sound absorbing light diffusing medium, in which the sound absorbing light diffusing medium is disposed at the bottom and the lamps are located above the sound absorbing light diffusing medium and between the sound absorbing light diffusing medium and the sound barrier, in which the sound barrier substantially interrupts the transmission of the sound from one area to an adjacent area and reflects the light from the lamps to the sound absorbing light diffusing medium, and in which the sound absorbing light diffusing medium diffuses the light from the lamps and the reflected light from the sound barrier as it passes into said one area, and not only serves as a sound absorbing medium to dampen any sound produced in said one area, but also conceals the sound barrier from view in said one area.

More specifically, the present invention aims to provide a three-part luminous ceiling as aforesaid, having a sheet metal sound barrier having an inner light reflecting face, a source of light such as tubular fluorescent lamps and a sound absorbing light diffusing plastic material in which the plastic material is located at the bottom and in alinement with the level of the upper ends of the vertical area-dividing partitions, the lamps are located above the plastic material and between the plastic material and the sound barrier, in which the sound barrier interrupts the transmission of sound from one area to an adjacent area and reflects the light from the lamps to the plastic material, in which the plastic material diffuses the light from the lamps and light reflected from the sound barrier as it passes into said one area and also serves as a sound absorbing medium to dampen any sound produced in said one area and conceals the sound barrier from view in said one area leaving the area between the level of the upper ends of the vertical area-dividing partitions and the structural ceiling unobstructed for the reception of air ducts, wiring, conduits for heating systems and for water.

These and other features, capabilities and advantages of the invention will appear from the subjoined detailed description of specific embodiments thereof illustrated in the accompanying drawings, in which—

Fig. 1 is a fragmental transverse section more or less diagrammatically illustrating one embodiment of the invention.

Fig. 2 is a fragmental detail in section showing the connection between two troffers equipped with channels for light diffusers.

Fig. 3 is a fragmental transverse section more or less diagrammatically illustrating a second embodiment of the invention.

Fig. 4 is a fragmental transverse section more or less diagrammatically illustrating a third embodiment of the invention.

Fig. 5 is a fragmental detail partly in section showing the support for the troffers and the light diffusers.

Fig. 6 is a fragmental detail partly in section showing a connector similar to Fig. 5 which is connected to a beam instead of being connected to a hanger.

Fig. 7 is a fragmental transverse section more or less diagrammatically illustrating a fourth embodiment of the invention.

Fig. 8 is a fragmental detail partly in section showing sound absorbing shocks connected to the hangers.

Fig. 9 is a fragmental enlarged detail partly in section showing a piece of corrugated light diffuser made according to one embodiment of the present invention.

Fig. 10 is a section on the line 10—10 of Fig. 3.

Fig. 11 is a cross section enlarged of a laminated plastic sheet.

In the embodiment illustrated in Fig. 1, the troffers 1 are illustrated as inverted metal pans, such for instance as the troffers illustrated in United States Letters Patent No. 2,597,875 dated May 27, 1952, having an upper wall 2 and downwardly extending side walls 3. In the end walls 4 there are provided, in the present instance, lamp sockets to receive the ends of tubular fluorescent lamps 5, five lamps being provided for each troffer 1. These troffers 1 may be connected to the permanent structural ceiling 6 by any suitable means, such as the hangers 7. In the present instance the hangers 7 are divided into two parts 8 and 9, which are separated from one another by the sound absorbing shocks 10, see Fig. 8. The shocks 10 preferably are composed of rubber having a diminished collar 11 and an annular base 12, provided with an opening 13 to receive the shank 14 of a bolt having a head 15 and a nut 16. In the present instance, the upper section 8 of the hanger 7 has a laterally extending arm 17 parallel to the laterally extending arm 18 of the lower hanger section 9. The arm 18 has an opening to receive the diminished collar 11 of the shock unit 10 and the arm 17 has an opening to receive the shank 14 so that the arms 17 and 18 may be connected to one another and therewith hold the sections 8 and 9 connected to one another with the head of the bolt resting on the arm 17, the shank 14 extending through the sound absorbing shock 10 and the nut 16 screw threadedly connected to the screw threaded portion 19 of the shank 14 and resting against the lower face of the annular base 12, all as shown in Fig. 8. Excellent results have been achieved when the sound absorbing shock 10 is composed of rubber.

In the space above the troffers 1 may be provided conduits 20 forming air ventilating ducts or the like, structural beams 21 or conduits for conveying hot and cold water, such as the pipes 22. The lower edges of the troffers 1 are preferably in alinement with the upper ends of the vertically extending partitions 23 dividing one room area 24 from another room area 25. The lower edges of the end or side walls 2, 3 of the troffers 1 may be provided with outwardly extending flanges 26 and 27, see Fig. 2, which rest upon one another and are connected not only to one another, but also to the partition 23 by bolts having the heads 28 resting on the flange 27 and the shanks 29 extending through the flanges 27, 26, sound absorbing buffer 30 and into the upper end of the partition 23. Preferably the inner faces of the lower ends of the walls 3 as an instance have channels 31 secured thereto. In this embodiment the light diffusers 32, composed as an instance of a translucent plastic material, are preferably yieldable or bendable so that they can be bent and the edges protrude into the channels 31 and be supported in place by the channels 31.

According to the present invention the light diffusers 32 are not only composed of a translucent material to permit the light to pass therethrough from the lamps 5, but also composed of a sound absorbing material. The troffers 1 in turn are composed of sheet metal and to that extent constitute a sound barrier to prevent any sound produced in the area 24 from passing through the troffer 1 into the area above the troffers 1 so that such sound may not be transmitted over into the area 25. Furthermore, the light diffusers 32 are composed of a material which will not only permit the light to pass therethrough, but will also absorb or dampen the sound so that the sounds produced in the area 24 will be dampened and diminished in intensity in the interest of the comfort of the occupants of the area 24. Excellent results have been achieved when the physical properties of the diffusers 32 are translucent or light transmitting, are sound or acoustically absorbent having relatively closely spaced openings, perforations or apertures passing therethrough between its upper and lower surfaces. The material 32 may be laminated plastic sheets, a single plastic sheet or a plastic sheet with paper sheets calendered to the upper and lower faces thereof. In the interest of rigidity to facilitate suspending it at its ends on parallel bars, the sheet 32 is corrugated, see Fig. 9.

Excellent results have been achieved when the diffusers 32 have been composed of the material disclosed in the application for patent of Jordan J. Baruch, filed December 29, 1955, bearing Ser. No. 483,467, which material consists primarily of styrene, polystyrene, polyester, polyester resins, and relatively rigid polyvinyl plastics, such as polyvinyl chloride and acetate, known as "Vinylite." Excellent results have been achieved when this material was as thin as .010 inch in thickness, both from the standpoint of transmitting light and absorbing sound. The thickness obviously may increase indefinitely without detracting from the sound absorbing properties of sheets made of this plastic material. On the other hand, it has been found that the best results have been achieved from the standpoint of transmitting light when the thickness does not exceed one inch. In the embodiment shown in Fig. 11, the paper sheets 71 and 72 are shown calendered to the upper and lower faces of a plastic sheet 73 such as disclosed in the aforesaid patent application Serial No. 483,467.

From the standpoint of constituting a sound barrier, it has been found that excellent results have been achieved when the gauge of the metal of the troffers is as thin as .030 to .040 of an inch. While excellent results have been achieved with the plastic material aforesaid of Jordan J. Baruch, satisfactory results have also been achieved when these light diffusers were composed of the plastic material commercially sold as "Cellotex" and having dimensions similar to the dimensions of the "Acoustilux" of Jordan J. Baruch above referred to.

In view of the substantially even curve produced throughout the entire audible range of the "Acoustilux" of Jordan J. Baruch as compared to other sound absorbing materials, and the fact that when corrugated it lends itself to being suspended from edge to edge of the bottom of a troffer, this material lends itself particularly to the combination here sought to be covered. The sound absorbing efficiency of this "Acoustilux" at audible ranges of 125 decibels to 4000 decibels as compared to "Cellotex" and the standard acoustical tile, will appear from the following table:

| Decibels | "Acoustilux" | "Cellotex" | Standard Acoustical Tile |
| --- | --- | --- | --- |
| 125 | .34 | .06 | .12 |
| 250 | .67 | .26 | .62 |
| 500 | .83 | .83 | .79 |
| 1,000 | .78 | .95 | .86 |
| 2,000 | .70 | .71 | .68 |
| 4,000 | .55 | .58 | .51 |

The embodiment disclosed in Fig. 3 departs from the embodiment disclosed in Fig. 1 primarily in that the light diffuser for each troffer 33 consists not only of two plastic sheets 34, but also of a baffle or louver unit 35. Excellent results have been achieved when the baffles or louvers are similar to the louver disclosed in United States Letters Patent No. 2,559,640, dated July 10, 1951. In Fig. 10 the louver 35 is illustrated as connected to the end walls 36 and 37 of the troffer 33 by the links 38 and 39 such as disclosed in the latter United States Letters Patent No. 2,559,640. The louver 35 as shown in Fig. 3 extends from end wall 36 to end wall 37 of each troffer 33 about midway thereof between the two plastic sheets 34, 34.

The embodiment disclosed in Fig. 4 departs from the embodiment disclosed in Fig. 1 primarily in the shape of the troffer 40 which in outline is more like the outline disclosed in aforesaid United States Letters Patent No. 2,597,875. Each troffer 40 has lower side flanges 41. When the flange 41 is adjacent to a hanger 42, the hanger 42 is provided with a bracket 43 having a pair of opposing bayonet hooks 44 and 45 to receive the enlarged projection 46 of the upward extension 47 from the platform portions 48 and 49 extending from opposite ends of the extension 47, and the ends of the plastic light diffuser 50 rest on a platform 48 or 49 and the flange 41 thereupon rests upon the portion of the light diffuser 50 resting on the platform 48, 49 as shown in Figs. 4 and 5. If the flange 41 is disposed adjacent to a beam, such as the beam 51, then a bracket 52 is provided similar to the bracket 43, but its upper arm 53 disposed at right angles to the pair of complemental hook members 54 and 55 and the arm 53 connected to the lower face of the beam 51. The hook portions 54 and 55 here also grip the enlargement 56 of the arm 57 extending upwardly from the platform portions 58 and 59, and the platform 58 or 59 receives the end of the plastic light diffuser 50, and the flange 41 of the troffer 40 rests upon the end of the light diffuser 50 which rests upon a platform 58, 59. When the hangers 42 are disposed adjacent to a partition 60, as shown in Fig. 4, then one of the platforms 48, 49 rests upon the plate 61 which in turn is spaced from the partition 60 by the sound absorbing shock unit 62 and connected thereto by a bolt 63.

The embodiment disclosed in Fig. 7 departs from the embodiment disclosed in Fig. 1 primarily in that the acoustic light transmitting plastic sheet 64 is spaced from the vertically extending walls 65 of each troffer 66 and connected to the same by any suitable means, such as pairs of inclined rods 67, 68 connected at their lower ends to the outer edges of the sheet 64 and at their inner ends to the upper wall 69 of the troffer 66 adjacent the lamps 70.

In all of those embodiments it will be seen that the light transmitting, sound absorbing, plastic sheets 32, 34, 50 and 64 are substantially in alinement with the upper end of the vertical partition between adjacent room areas, such as the partition 23 between the room areas 24 and 25. It will also be seen that the troffers, such as the troffers 2, 33, 40 and 66, extend upwardly from the level of the acoustic sheets, such as the sheet 32 of Fig. 1, into the area reserved for the construction equipment such as the duct 20, beam 21 and pipe 22 illustrated in Fig. 2. Consequently, the lighting fixture does not occupy any of the space reserved for the room area and in turn, the partitions, such as the partition 23 of Fig. 1, is not required to be built up to the permanent ceiling 6 or beam 21 but may terminate at the level of the acoustic sheet 32, see Fig. 1.

After extensive experiments, in the interest of reducing the costs of building partitions, such as the partitions 23, from the level of the luminous ceiling determined by the plastic sheet 32 to the structure ceiling, such as the ceiling 6 or beam 21 of Fig. 1, and nevertheless not only reduce the sound in each room to a minimum, but also prevent the sound from passing from one room to the other above the dividing partitions, such as the partitions 23—it has been found that excellent results have been achieved when a plastic sheet, such as the plastic sheet 32 aforesaid, is disposed at the level of the upper ends of the partitions 23, and due to its composition constitutes the luminous ceiling surface with the lamps disposed above the plastic sheet 32, and metal troffers, such as the troffers 2, Fig. 1, are disposed above the lamps and seal off the space from one partition to the other. In this construction as aforesaid, the plastic sheets, such as the sheet 32, Fig. 1, not only transmit the light from the lamps 5 above the same down into a room area such as the room 24, but also absorb the sounds created in the room area below, such as the room area 24, and to that extent of course reduce the sound that will be transmitted from the room area 24 to the troffer 2. The troffers 2 are composed of metal as aforesaid constituting a continuous metal partition between the room area 24 and the area above the same in turn constituting a barrier to reduce to a minimum, if not entirely to eliminate, any of the sounds that pass from the room area 24 beyond the acoustic partition 32 into the area above the barrier formed by the metal troffers 2.

The inner faces of the troffers 2 are preferably reflective in order to reflect the light from the lamps 5 to the sheet 32. The sheet 32, on the other hand, serves not only to transmit light from the lamps 5 and to absorb sounds created in the room area below, but also to conceal the troffer 2 from view in the room area below.

It is obvious that various changes and modifications may be made to the details of construction without departing from the general spirit of the invention as set forth in the appended claims.

I claim:

1. The combination of vertical partitions spacing an area into rooms and terminating at a horizontal level spaced from the structural ceiling to accommodate building equipment and the like above the same, sheet metal troffers extending up from the horizontal plane in which terminate the upper ends of said partitions, fluorescent tubular lamps mounted in said troffers, and a plurality of sheets of light transmitting, sound absorbing plastic material in the horizontal plane in which terminate the upper ends of said partitions substantially sealing off the lower ends of said troffers and disposed below said lamps, the inner faces of said troffers being reflective to reflect the light from said lamps to said sheets, and said troffers being connected to one another to form a complete metal barrier between the area below the horizontal level of the upper ends of said partitions and the area above the same and thereby form a sound barrier between the area of adjacent rooms and supplementing said sheets which intercept and absorb sound from passing from one room to another.

2. The combination as set forth in claim 1 in which said sheets are corrugated and in thickness range from 0.010 inch to 1 inch and the sheet metal of said troffers ranges in thickness from 0.030 to 0.040 of an inch.

References Cited in the file of this patent

UNITED STATES PATENTS

| | | |
|---|---|---|
| 1,522,708 | Andrews | Jan. 13, 1925 |
| 1,697,521 | Collins | Jan. 1, 1929 |
| 2,659,808 | Beckwith | Nov. 17, 1953 |
| 2,674,686 | Harrison | Apr. 6, 1954 |
| 2,752,017 | Segil | June 26, 1956 |